United States Patent
Ranganathan et al.

(10) Patent No.: US 7,757,023 B1
(45) Date of Patent: Jul. 13, 2010

(54) STORAGE-CENTRIC MANAGEABILITY IN A SYSTEM

(75) Inventors: Parthasarathy Ranganathan, Fremont, CA (US); Vanish Talwar, Palo Alto, CA (US); Mustafa Uysal, Vacaville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 11/888,348

(22) Filed: Aug. 1, 2007

(51) Int. Cl.
*G06F 13/12* (2006.01)
*G06F 15/16* (2006.01)

(52) U.S. Cl. .................................. 710/74; 709/225
(58) Field of Classification Search ............... 710/74; 709/225
See application file for complete search history.

(56) References Cited

U.S. PATENT DOCUMENTS

| | | | |
|---|---|---|---|
| 5,619,726 A * | 4/1997 | Seconi et al. | 710/22 |
| 7,334,086 B2 * | 2/2008 | Hass et al. | 711/123 |
| 2006/0107311 A1 * | 5/2006 | Dawson et al. | 726/5 |
| 2007/0104452 A1 * | 5/2007 | Wang et al. | 386/46 |

* cited by examiner

*Primary Examiner*—Henry W. H. Tsai
*Assistant Examiner*—Juanito C Borromeo

(57) ABSTRACT

A system architecture for delegating a storage-centric manageability (SCM) task that includes a host system that includes a host computing element and a data storage area, wherein the host computing element operates to access the data storage area via a first communication or data path, a delegated computing element that operates to access the data storage area via second data path for executing a delegated SCM task, wherein the second data path is different from the first data path.

19 Claims, 11 Drawing Sheets

STORAGE-CENTRIC MANAGEABILITY IN A SYSTEM

RELATED APPLICATIONS

This application is related to U.S. patent application Ser. No. 11/888,343, filed on Jul. 31, 2007, and entitled, "MANAGEABILITY PLATFORM IN AN UNIFIED SYSTEM" and U.S. patent application Ser. No. 11/888,349, filed on Jul. 31, 2007, and entitled, "SYSTEMS AND METHODS FOR EXCHANGING RUNTIME FUNCTIONALITIES BETWEEN SOFTWARE STACKS", which are herein incorporated by reference in their entireties.

BACKGROUND

Manageability is a key requirement for a broad spectrum of information technology (IT) systems ranging from laptops to blade servers to clusters to large scale data centers. With rising complexity and scale in tomorrow's enterprise IT, systems management has become a dominating cost. As referred herein, manageability includes management and maintenance tasks or operations that deal with bringing up, maintaining, tuning, and retiring a system. Also referred herein, and as understood in the art, information technology, or IT, encompasses all forms of technology, including but not limited to the design, development, installation, and implementation of hardware and software information or computing systems and software tasks, used to create, store, exchange and utilize information in its various forms including but not limited to business data, conversations, still images, motion pictures and multimedia presentations technology and with the design, development, installation, and implementation of information systems and tasks. Thus, examples of IT management and maintenance tasks or operations include diagnostics and recovery, security protection, backups, resource provisioning, and asset management of IT systems.

At a broader level, the scope of IT manageability may be associated with the lifecycle phases for servers and data centers, including bring up, operation, failures/changes, and retire/shutdown phases. Various manageability tasks are performed at each of these life cycle stages. Examples include provisioning and installation of servers, monitoring performance and health of systems, security protection against viruses and spyware, backup protection against disasters, disk maintenance to improve performance, fault diagnostics and recovery, and asset management to track resources. Particularly, there is a class of manageability tasks that routinely runs during the operation lifecycle phase of an IT system and requires extensive access to the storage space in the IT system. These manageability tasks are storage-centric because they require constant access to the storage space for a period of time (or all the time). Examples of storage-centric manageability tasks include virus scanning, disk backups, disk (memory) integrity checking, and system fault diagnosis. The storage-centric manageability tasks have several common characteristics. First, most of these tasks are predominantly "read-only" and often process large amounts of data in the storage space (thus, requiring constant access to the storage space for a period of time) to provide a summary status report (e.g., virus scanning, disk auditing). Second, in most cases, the storage-centric manageability tasks run as background processes and are fairly insensitive to changes in their execution times as long as they make reasonable forward progress.

Traditionally, storage-centric manageability tasks have been executed on the host processor, sharing hardware and software resources with host system tasks in an IT system. This sharing leads to resource interference and hence degradation in performance. FIG. 1 illustrates such a traditional system architecture 100, wherein there is provided a host processor, such as a central processing unit (CPU) 101 (or any computer processor from, for example, Intel, AMD, and Cyrix), for executing both manageability tasks and host system tasks. The CPU 101 is connected to a memory controller hub, such as one typically implemented by a northbridge 102, via a system bus 130 or point-to-point links (not shown). As known in the art, the northbridge 102 is a chipset that generally integrates a number of high bandwidth input/output (I/O) buses that are typical for high-performance graphics, cache memory, or network adapter such as a peripheral component interconnect (PCIe or PCI express) video graphics card 104 and a memory device 107 such as a computer random access memory (RAM) module. The northbridge 102 also includes a connection, such as a PCIe connection 140, to an I/O controller hub, such as one typically implemented by a southbridge 103. As known in the art, the southbridge 103 generally integrates several I/O devices such as network interface cards (NICs), disk controllers for one or more storage devices, audio (not shown), an interface bus for device connection, and other devices in lower performance expansion slots through an I/O bus separate from the system bus 130. An example of a NIC includes an Ethernet land area network (LAN) card 105. Examples of a disk controller include a serial advanced technology attachment (SATA) controller 108 for a SATA disk drive, an integrated drive electronics (IDE) controller 109 for an IDE disk drive, and a smaller computer system interface (SCSI) controller 110 for a SCSI disk drive. An example of an audio device includes an audio or sound card. Examples of an interface bus include a universal serial bus (USB) for connection of an USB device thereto and a firewire or IEEE 1394 bus for connection of a firewire device thereto. An example of a lower performance expansion slot includes a PCI slot for connection of a PCI card or device.

Additionally, some storage-centric manageability tasks introduce additional constraints to a system architecture that go beyond performance. For example, given the critical nature of many of the storage-centric manageability tasks, system administrators typically desire a strong control over the execution of these tasks and do not want system users to disable or change configurations in ways that may undermine protection levels. Also, some storage-centric manageability tasks are routine tasks that may need to run periodically, sometimes even when the system is not being used or powered off. Thus, such tasks require more sophisticated optimizations for power efficiency. Additionally, certain storage-centric management tasks such as virus scanning may benefit from higher levels of privilege and isolation from the host tasks in order to better enforce security.

To address at least some of the above concerns, there exist a number of enhanced system architectures, as illustrated in FIGS. 2 and 3, that may be employed to separately run host and manageability tasks. FIG. 2 illustrates an enhanced system architecture 200, which is identical to the traditional system architecture 100, except for the use of a dual-core processor or CPU having a first core 212 and a second core 213. In the enhanced system architecture 200, the manageability tasks may be executed by the second core 213 while the host tasks may be executed by the first core 212. FIG. 3 illustrates another enhanced system architecture 300, which is identical to the traditional system architecture 100, except for the use of multiple distinct processors such as CPUs 312 and 313 instead of just one processor such as the CPU 101 in FIG. 1. In the enhanced system architecture 300, the manageability tasks may be executed only by the second CPU 313 while the host tasks may be executed by both the first CPU 312 and the second CPU 313.

However, the software model for both the enhanced system architectures 200 and 300 is similar to the software model for the traditional architecture 100. FIG. 4 illustrates such a software model 400 with a single operating system (OS) image 403 across a single-core processor, multiple cores of a single processor, and multiple processors of a host system 410 and a coherent view of the caches and memory. From an I/O perspective, the manageability tasks 401 and the traditional host tasks 402 both submit requests for I/O access to the same OS image 403, which direct I/O drivers 404 to access the desired I/O devices, such as the hard disk memory 406 via the I/O controller (for example, southbridge) 405 in the data storage area or subsystem 420. The buffer caches and other scheduling decisions are all handled by a single OS instance, namely, the OS image 403. If concurrent address to disk blocks is made, the OS 403 serializes them and submits the I/O requests in an order determined by an I/O scheduler (not shown). Thus, as in the traditional system architecture 100, the enhanced system architectures 200 and 300 continue to share some of the resources such as hardware caches, memory bus, and OS buffer caches, which continue to exhibit resource interference and hence degradation in performance. Additionally, the enhanced system architectures 200 and 300 may have power inefficiencies from having an entire core or processor powered on for manageability tasks.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are embodiments for an architecture of a host system, such as an architecture for an IT system (personal computer, server, mainframe, etc.), that is operable for delegating storage-centric manageability tasks in the system to a separate computing or processing element in order to provide superior performance for the remaining host system tasks at higher system power efficiencies in the system. As referred herein, host system tasks are tasks other than the manageability tasks. Thus, host system tasks include end-user tasks that are performed by the host system for the end-user in accordance with a particular software task that the end-user selects to run in the host system, whereby such end-user tasks are not directed to the management or maintenance of the host system.

Figure 5:
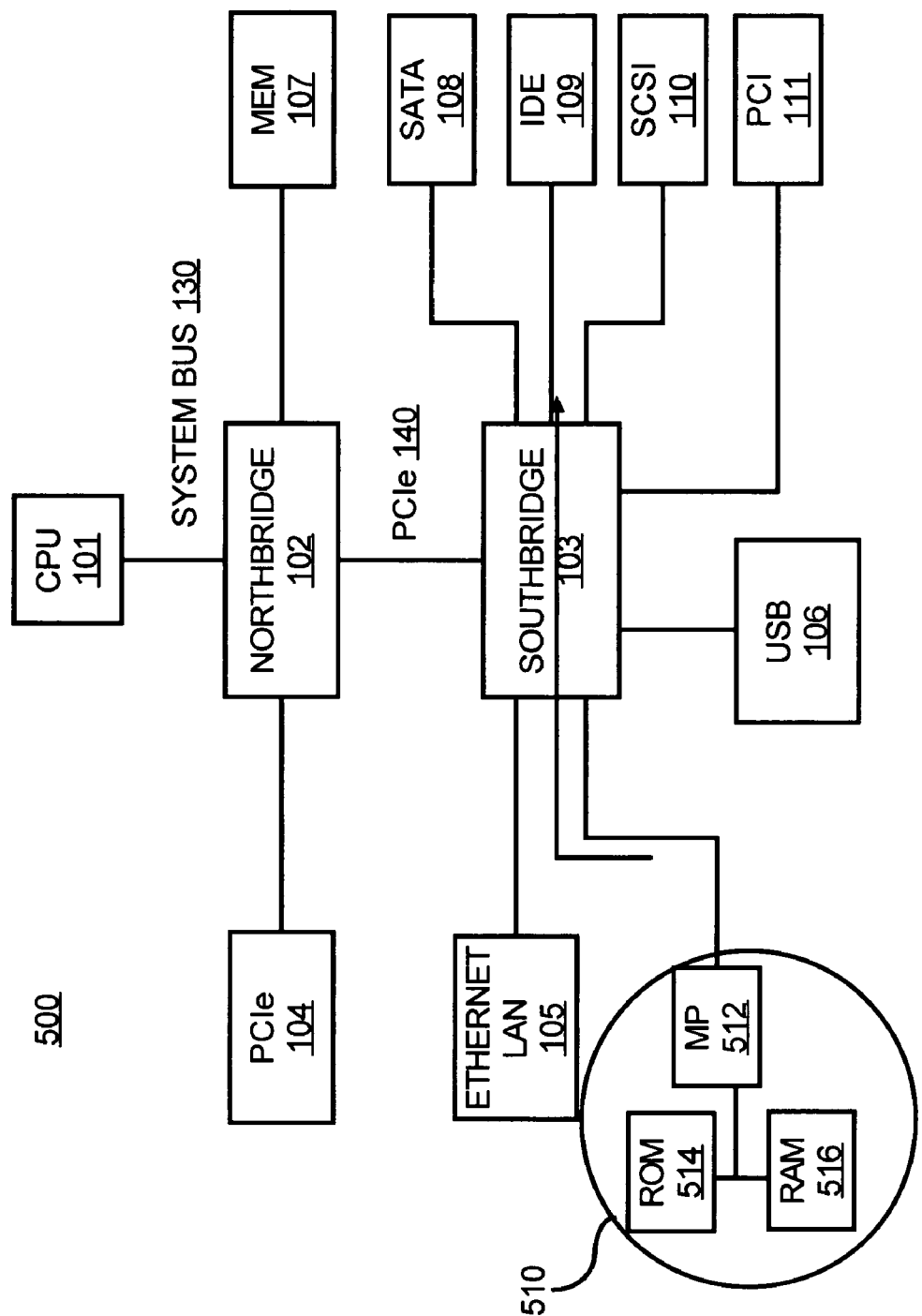
FIG. 5 illustrates a system architecture for delegating storage-centric manageability tasks in a system, in accordance with one embodiment.

FIG. 5 illustrates a system architecture 500 of a host computer system, such as a personal computer, a server, or a mainframe, that delegates manageability tasks, particularly storage-centric manageability tasks, to a delegated point that includes a processing element 512 separate from the host CPU 101. In one embodiment, the delegated point is a manageability platform 510 that is integrated in the host system at the southbridge 103. Although discussions herein are made with reference to northbridge and southbridge as examples, it should be understood that such discussions are applicable to any memory controller hub in place of the northbridge 102 and a I/O hub (IOH) or any I/O controller hub in place of the southbridge 103. Because the manageability platform 510 is separate from the rest of the host system, it is possible to provide an out-of-band power domain for the manageability platform 510 that is separate from the power domain for the rest of the host system.

From a hardware perspective, the manageability platform 510 includes a processing element 512 with supporting read only memory (ROM) 514 and RAM 516. In one embodiment, the processing element 512 is a general-purpose processor of any of a number of computer processors, such as processors from Intel, AMD, and Cyrix, that is operable to execute a myriad of manageability tasks instead of the typical task specific integrated circuits (ASICs) that are currently used in some computer systems for limited manageability functions. Thus, in one example, the processing element 512 is a manageability processor (MP) dedicated to executing manageability tasks in the host system, freeing up the main or host CPU 101 to execute host system tasks with higher performance. As illustrated in FIG. 5, the manageability platform 510 and its MP 512 therein have control and data paths (hereinafter, "communication path" or "data path") through the southbridge 103 to access the data storage area of the host system. These paths are separate from the communication paths the host CPU 101 uses to access the data storage area through the northbridge 102. When interfacing the MP 512 to a disk controller (108-110) in the data storage area, arbitration issues around concurrent disk accesses at the I/O controller (for example, the southbridge 103) from the host system and manageability platform are addressed through use of disk controllers that support hardware arbitration like SCSI and fiber channel controllers. Alternatively, for disk controllers that do not support such hardware arbitration, it is possible to provide a virtualized disk abstraction in software in those disk controllers to support arbitration.

From a software perspective, the software model for the manageability platform 510 includes two main components that may installed as firmware or software in the ROM 414 and resident in RAM 516 at runtime. The first component is a general software system that includes an embedded OS acting as core controller to host manageability software tasks and a set of standard software interfaces, such as those defined by Platform Management Components Interconnect (PMCI) Working Group of the Distributed Management Task Force (DMTF).

The second component of the software model pertains to synchronization of information across the host and manageability environments. For example, the I/O requests submitted by the host and manageability tasks could lead to multiple copies of disk data on the two OS stacks and consistency issues. There are several options to addressing these issues. In one option; the manageability platform 510 could only mount a read-only copy of the file system. All writes then take place only through the host. If the host performs any writes that are not written to the data storage area, such as a disk memory, while a storage-centric manageability task has started, the writes will not be reflected at the manageability platform 510. However, the next time the storage-centric manageability task runs, those writes become visible to such an task and are eventually considered by the task. In another option, snapshots are used and all writes are forced to have taken place before the storage-centric manageability task such as a virus scan or backup begins. The scan can then take place on the snapshots. In a third option, the host system and the manageability platform exchange runtime structures to maintain consistency.

Figure 6:
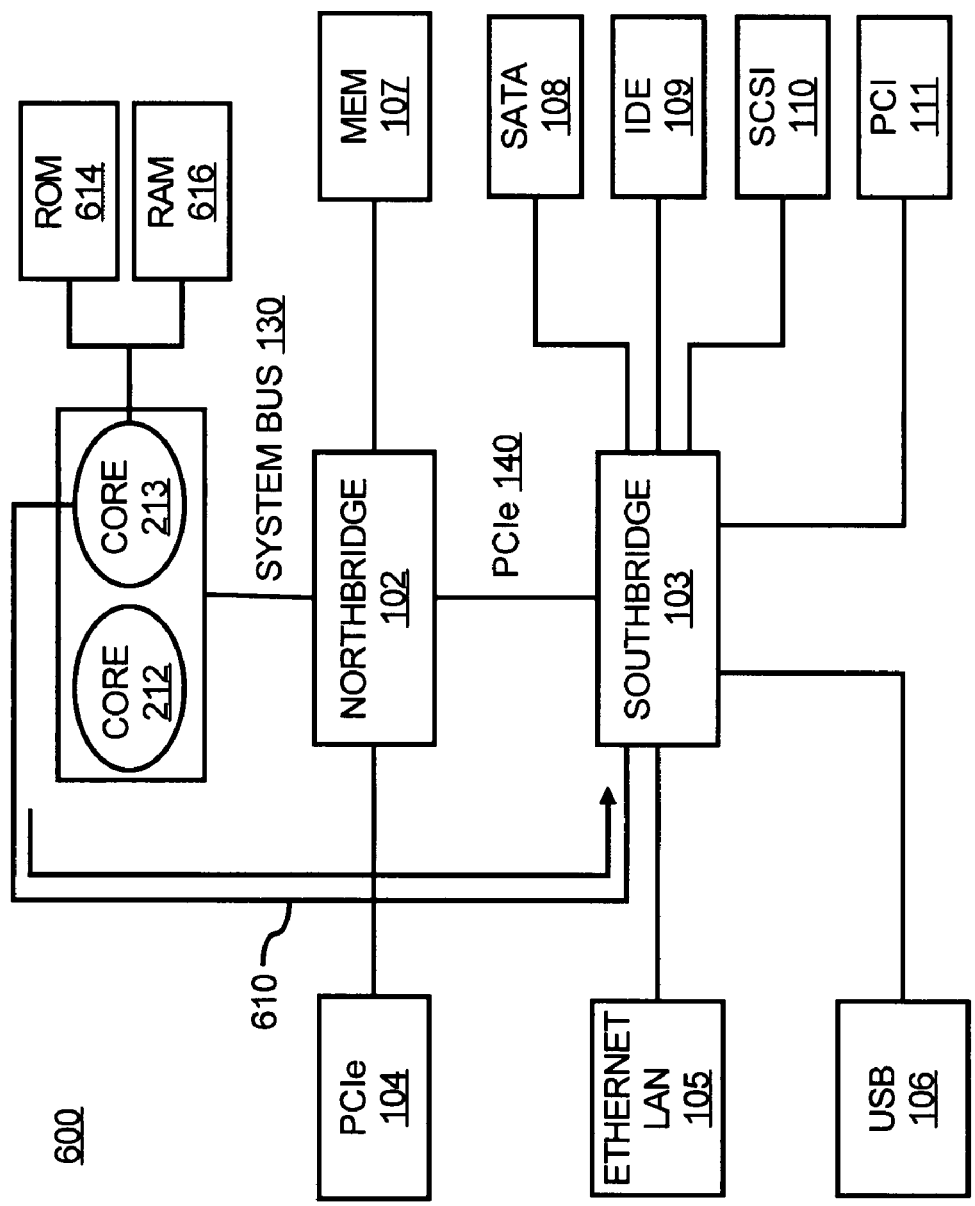
FIG. 6 illustrates a system architecture for delegating storage-centric manageability tasks in a system, in accordance with another embodiment.
Figure 7:
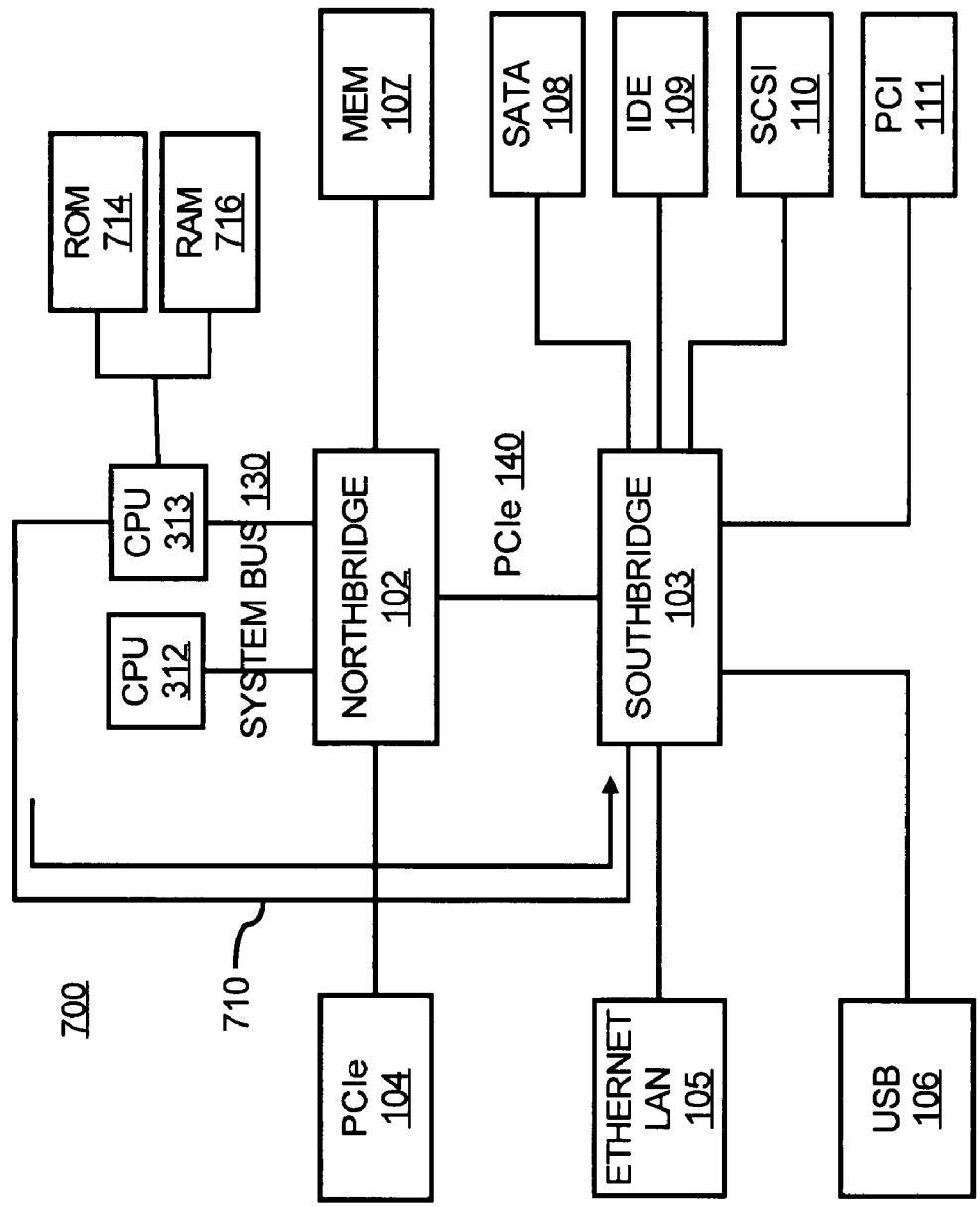
FIG. 7 illustrate a system architecture for delegating storage-centric manageability tasks in a system, in accordance with one embodiment.

FIG. 6 illustrates a system architecture 600 for delegating storage centric manageability tasks, in accordance with another embodiment. Unlike the system architecture 500, no separate manageability platform is implemented. Instead, a multi-core processor is used, wherein the first core 212 is used to execute host system tasks and the second core 213 is used as a separate processing element to execute manageability tasks, particularly storage-centric manageability tasks. As with the MP 512 in the manageability platform illustrated in FIG. 5, the second core 213 includes supporting ROM 614 and RAM 616 for hosting the manageability software model as discussed earlier and separate communication paths 610 from those used by the first core 212 to access the data storage area of the host system FIG. 7 illustrates a system architecture 700 for delegating storage centric manageability tasks in accordance with yet another embodiment. As with the system architecture 600, no separate manageability platform is implemented. Instead, multiple processors or CPUs are used, with the first CPU 312 used to execute host system tasks and the second CPU 314 used as a separate processing element to execute host system tasks as well as manageability tasks, particularly storage-centric manageability tasks. As with the MP 512 in the manageability platform illustrated in FIG. 5, the second CPU 313 includes supporting ROM 714 and RAM 716 for hosting the manageability software model as discussed earlier and separate communication paths 710 from those used by the first CPU 312 to access the data storage area of the host system.

Figure 1:
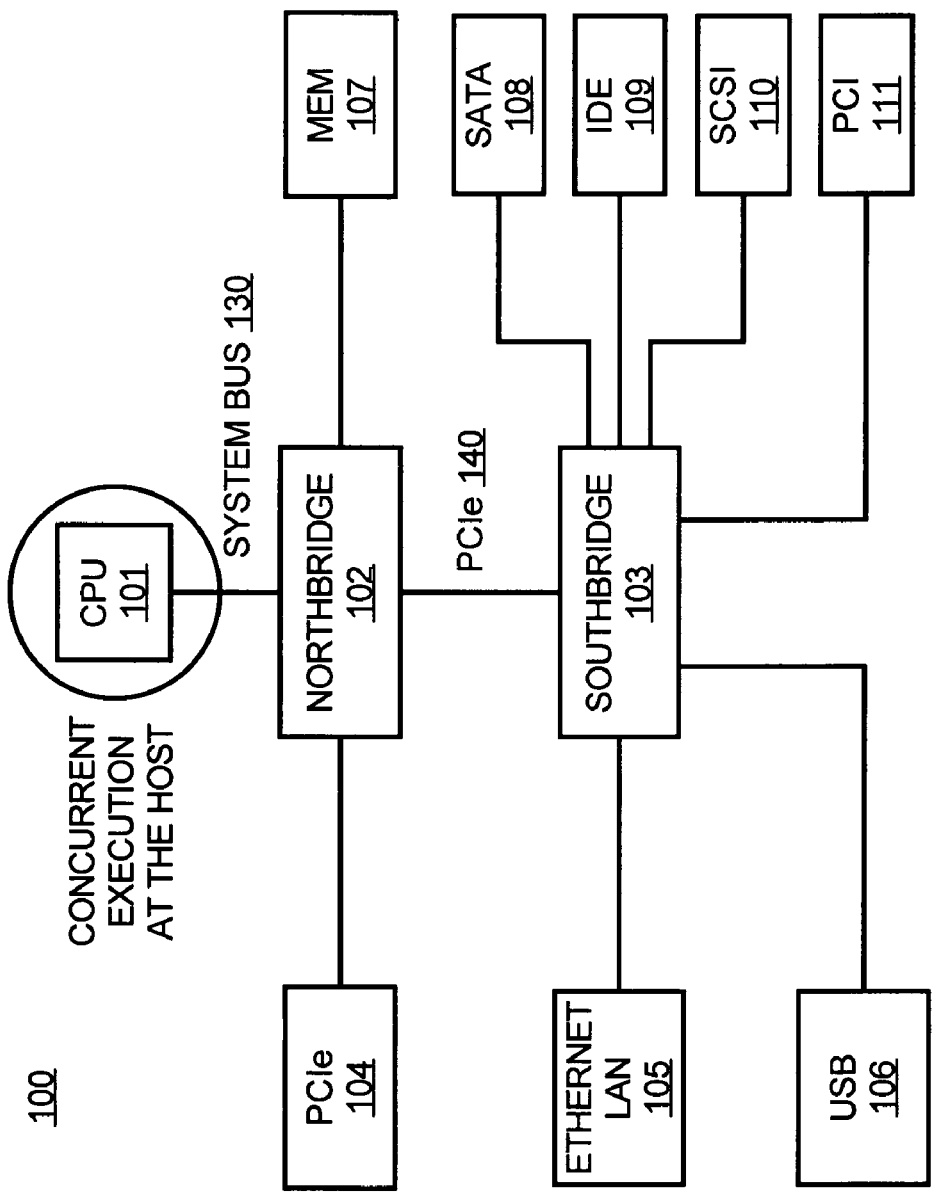
FIG. 1 illustrates a traditional system architecture for running both host tasks and manageability tasks.
Figure 2:
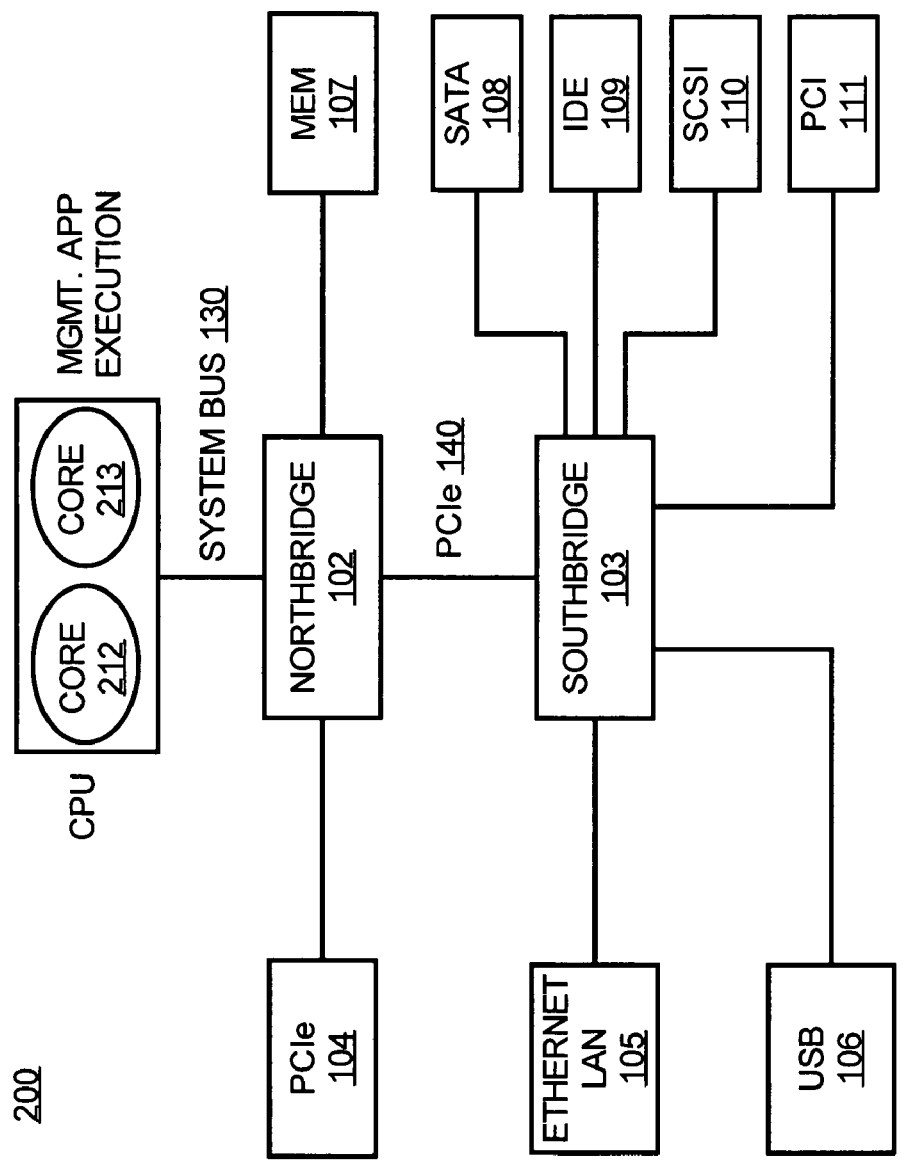
FIG. 2 illustrates an enhanced system architecture for running both host tasks and manageability tasks.
Figure 3:
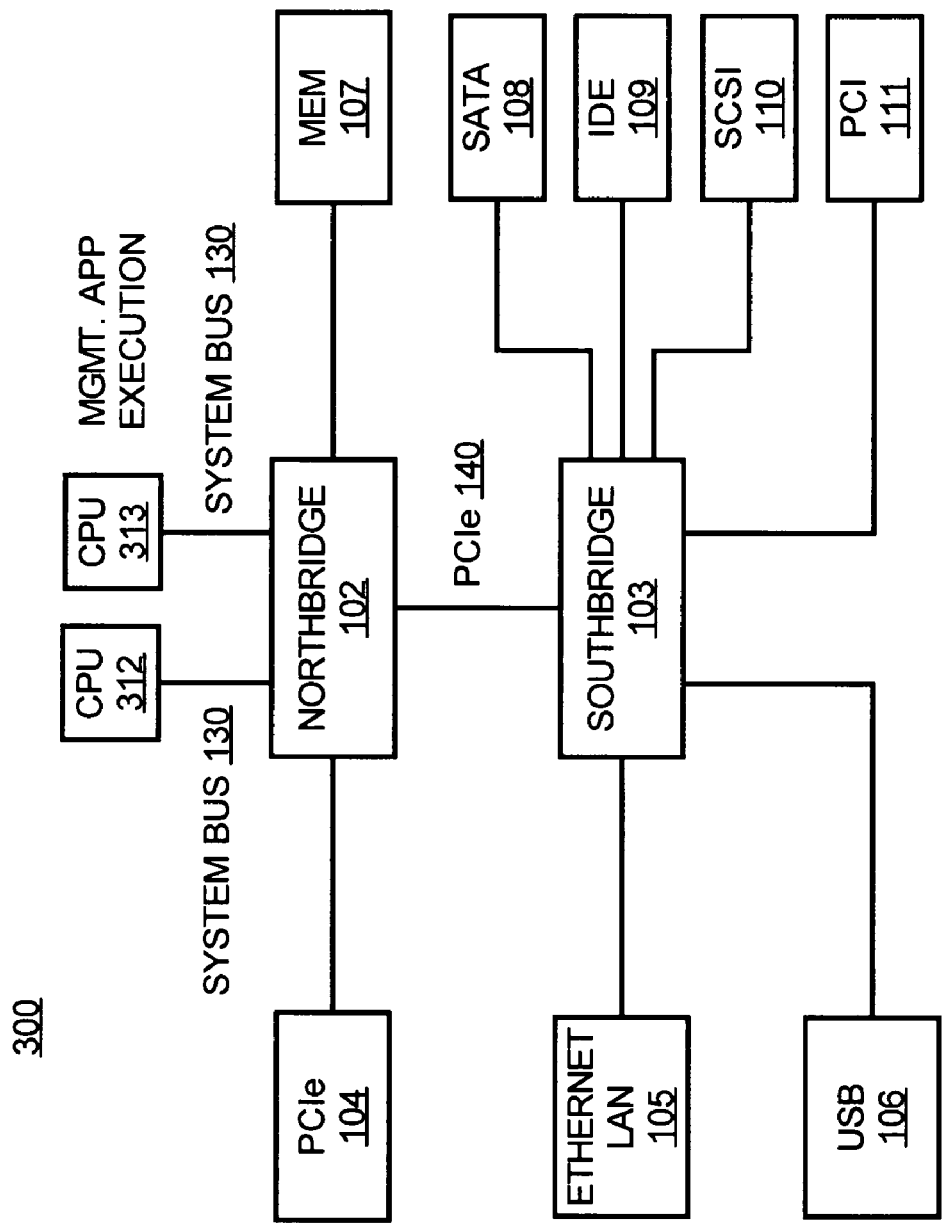
FIG. 3 illustrates another enhanced system architecture for running both host tasks and manageability tasks.
Figure 4:
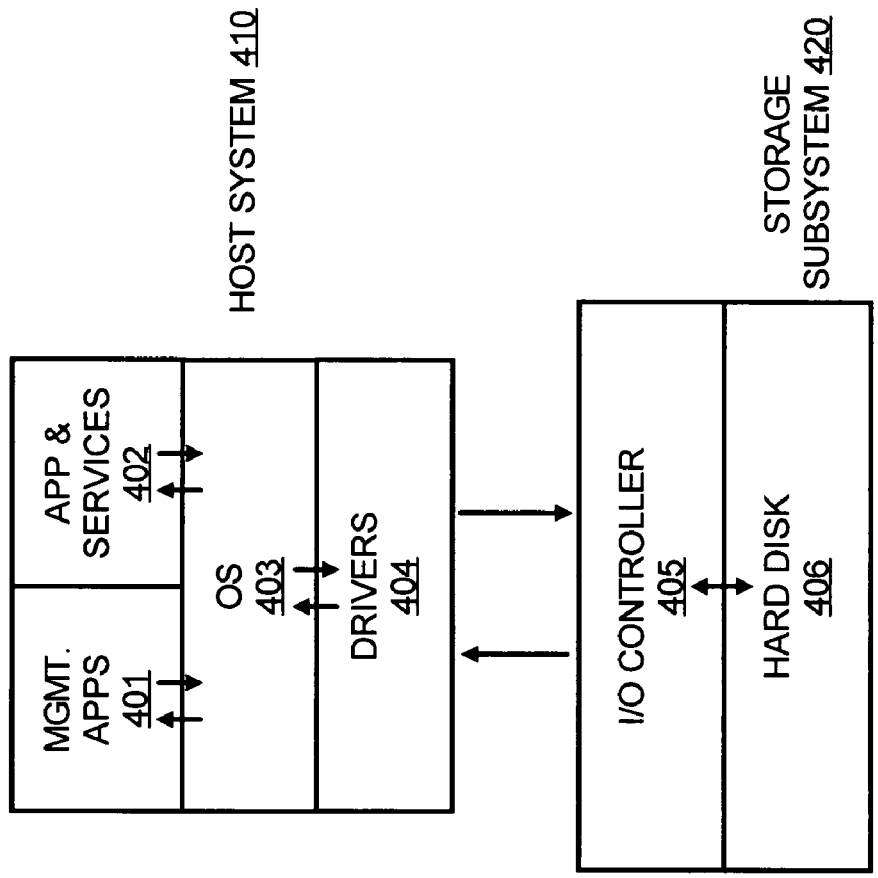
FIG. 4 illustrates a software model that is applicable for the system architectures in FIGS. 1-3.

An alternative embodiment is contemplated, wherein the system architecture is identical to the traditional system architecture 100 in FIG. 1, except that one of the disk controllers 108-110 is extended to include a more general-purpose processing element, such as a general-purpose CPU, with sufficient computing or processing capability to execute storage-centric manageability tasks that include access to the disk drive controlled by such a disk controller. Again, a ROM and a RAM may be provided to support such an extended disk controller.

Figure 8:
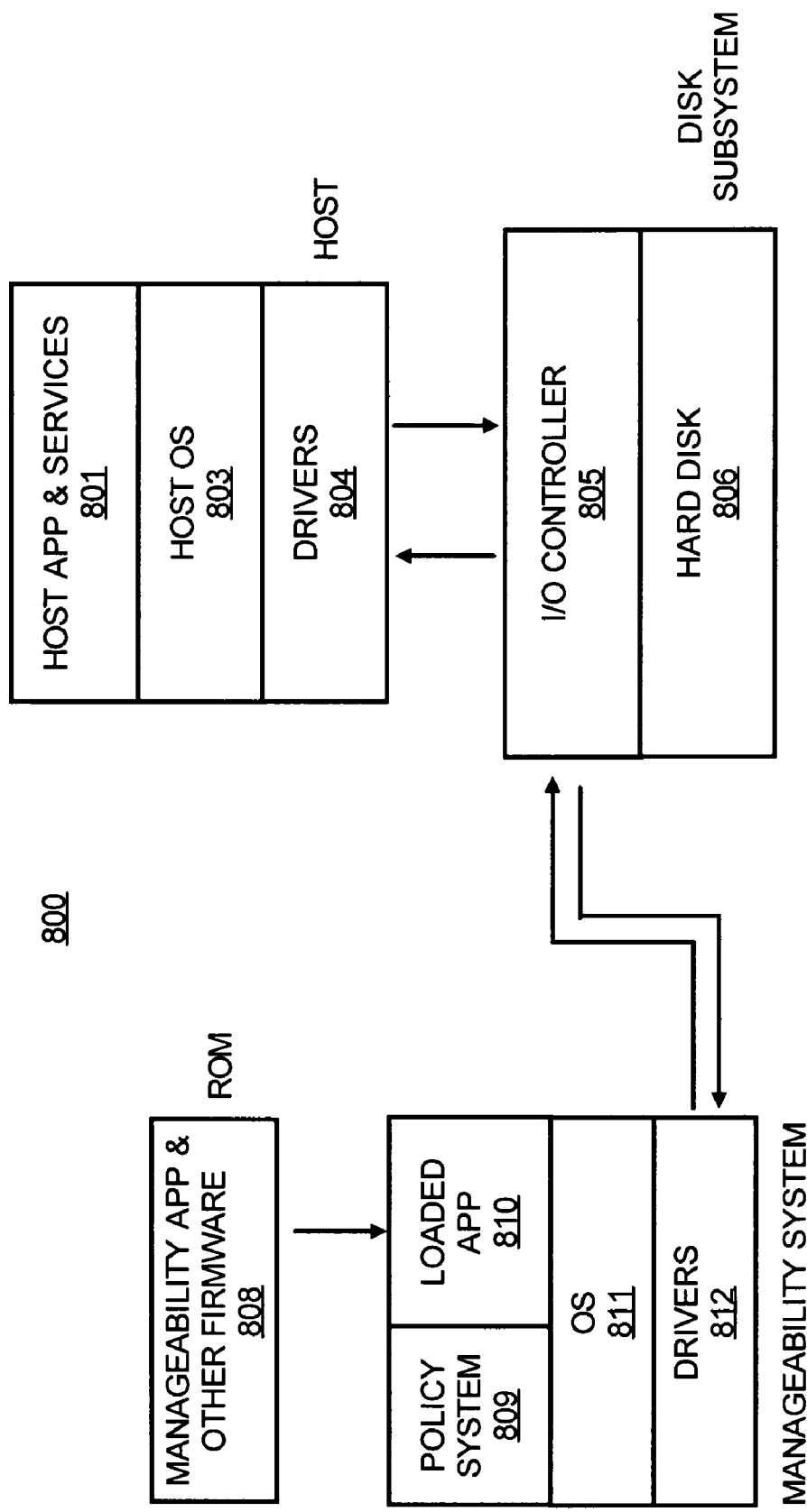
FIG. 8 illustrates a software model for the system architectures illustrated in FIGS. 5-7, in accordance with one embodiment.

FIG. 8 illustrates a software model 800 for the three system architectures 500, 600, and 700 illustrated in FIGS. 5-7. As illustrated the host system includes host system applications and services 801, a host OS image 803, and I/O drivers 804 for interfacing with one or more desired I/O devices via, for example, an I/O controller 805. In this figure, for simplicity, the I/O controller 805 represents both a typical I/O controller (such as a southbridge) and a device controller (such as a disk controller 108-110) for a data storage device 806 (such as a hard disk drive). In FIG. 8, the manageability system represents the separate manageability platform 510 in FIG. 5, the system that includes the processor core 213 and supporting ROM 614 and RAM 615 in FIG. 6, or the system that includes the processor 313 and supporting ROM 714 and RAM 715 in FIG. 7. The manageability system includes manageability applications, including storage-centric ones, and other firmware stored in a ROM (514, 614, or 714). The stored software or firmware may be loaded up at 810 for execution by a processing element (512, 213, 313) dedicated to the manageability system. The manageability system also includes an embedded OS image 811 that is separate from the host OS 803, in which a loaded application 810 may be executed, and a policy system 809 to provide pre-defined policies for executing the loaded application. The manageability system also includes drivers for interfacing with the host system, such as the aforementioned standard software interfaces defined by the PMCI Working Group.

Figure 9:
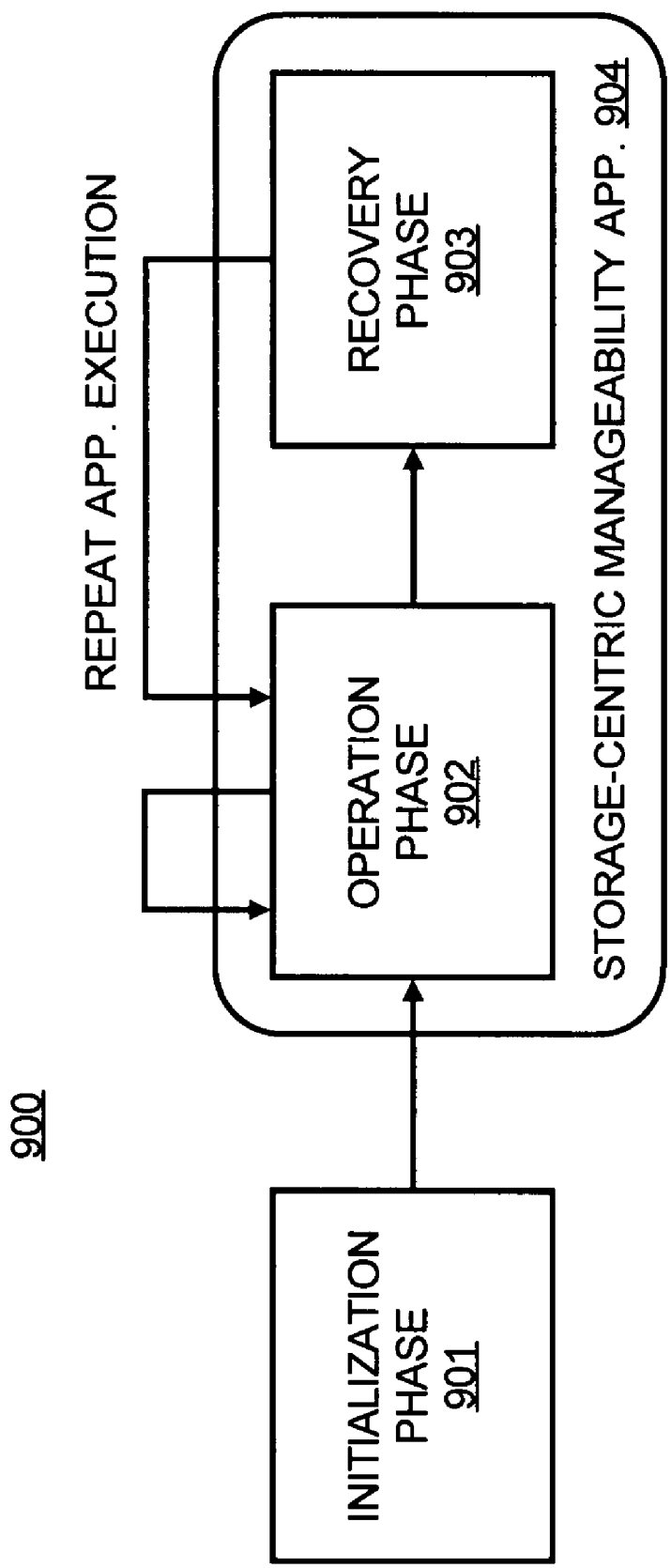
FIG. 9 illustrates a functional execution flow for a manageability application, such as a storage-centric manageability application, that follows within the software model illustrated in FIG. 8, in accordance with one embodiment.

FIG. 9 illustrates a functional execution flow 900 for a manageability application, such as a storage-centric manageability application 904, that follows within the software model 800 through three main phases. In the first, initialization phase 901, both the host and manageability systems and the I/O controller (for example, a southbridge) are set up and booted. In the second, operation phase 902, the application 904 is executed. In the third, recovery phase 903, appropriate administrative or reactive policies are applied by the policy system 809 on the application 904. The third phase is only performed in accordance with the administrative/reactive policies, and the flow 900 returns to the operation phase 902 to repeat the execution of the application based on the aforementioned administrative policies. For example, if the storage-centric manageability application 904 is a virus scan application, it is executed in the operation phase 902. In the recovery phase 903, administrative/reactive policies are only applied upon a virus detection, and the host system repeats the virus scan in the operation phase 902 to re-scan the host system after a policy pre-determined time period, as dictated by obligation policies that are also provided by the policy system 809. If no viruses are detected at the operation phase 902, the host system repeats the virus scan in the operation phase 902 after the pre-determined time period.

Figure 10A:
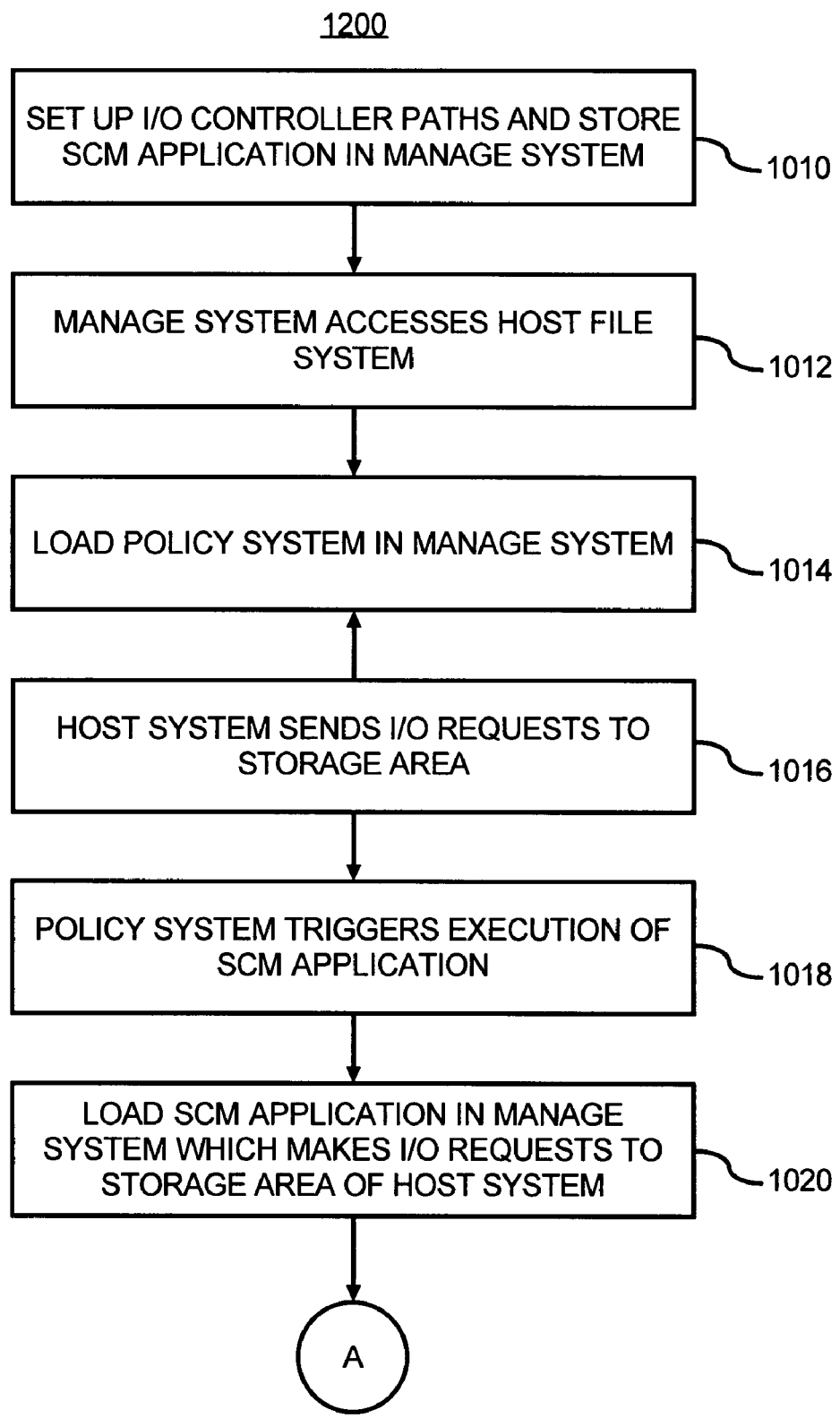
FIGS. 10A-B illustrate a method to execute a storage-centric management application, such as a virus scanner application, in accordance with one embodiment.
Figure 10B:
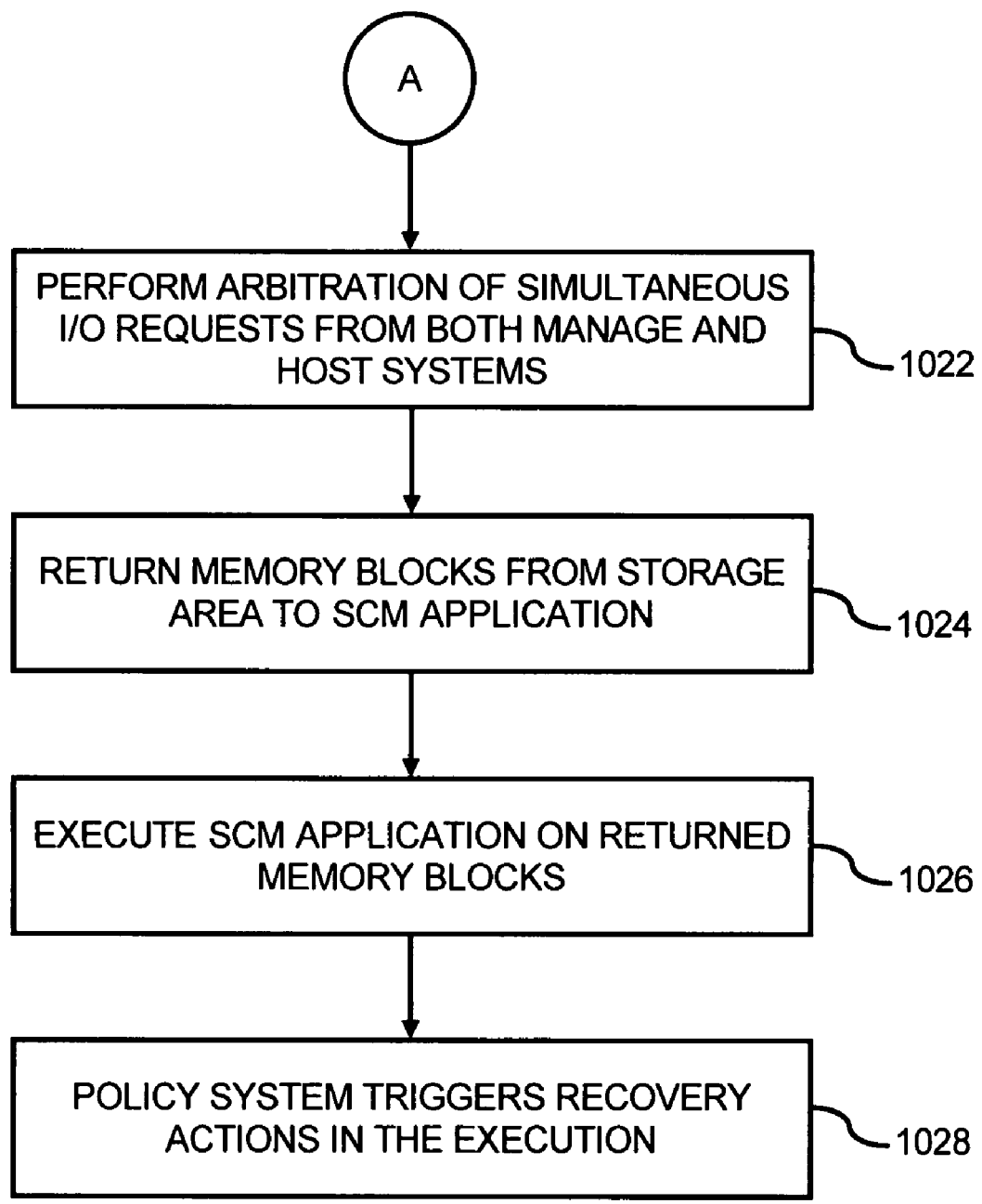

FIGS. 10A-B illustrates a method 1000 that follows the functional execution flow 900 illustrated in FIG. 8 to execute a virus scanner application in the interest of clarity, in accordance with one embodiment. However, it should be understood that the method 1000 is similarly applicable for any storage-centric manageability (SCM) application or task. Also, for illustrative purposes only and not to be limiting thereof, the method 1000 is discussed in the context of the software model 800 in FIG. 8 and the system architecture 500 in FIG. 5. Thus, for example, the method 1000 is also applicable for use with the system architectures 600 and 700, wherein the MP 510 as a processing element is replaced by a processor core 213 (FIG. 6) or a dedicated processor 313

(FIG. 7). In another example, the processing element may be implemented in one of the disk controllers 108-110 as noted earlier.

At 1010, at the initialization phase 901, the system architecture 500 is initialized, wherein different control and data paths used by the manageability platform 510 and the host system to access the data storage area of the system architecture 500 are set up, including initialization of the drivers 812 and 804. Furthermore, the virus scanner application, including the virus signatures for such an application, is stored or flashed into the firmware (in the ROM 154) of the MP 512.

At 1012, also in the initialization phase 901, when the host OS 803 is booted up, it mounts or accesses a file system that may be used to access the data storage area of the system architecture 500. Likewise, when the embedded OS 811 in the manageability platform 510 is booted up, it mounts or accesses the same file system used by the host OS as read-only in order to read data from the data storage area of the system architecture 500.

At 1014, also in the initialization phase 901, the policy engine or system 809 (e.g., also stored in the ROM 514) is loaded into the RAM 516 and initialized for use.

At 1016, in the operation phase 902, the I/O bound workloads from host applications 801 on the host system send in continuous I/O requests to a disk drive, for example, a SATA disk drive in which the disk controller 108 resides in FIG. 1 (also represented in the I/O controller 805 in FIG. 8) for storage access via a first communication path, through the drivers 804 and the same file system noted above.

At 1018, also in the operation phase 902, at the appropriate time, the policy system 809 triggers the virus scanner application to execute or perform a virus scan on the disk drive. The pre-defined policies to start the virus scan are specified as obligation policies in the policy system 809 that indicate obligations or specify particular actions that the virus scanner application is to take.

At 1020, also in the operation phase 902, once triggered, the virus scanner application 810 is loaded into the RAM 516 and makes calls to the same file system noted above. These calls lead to disk I/O requests to the disk drive via a second communication path, using the drivers 812.

At 1022, in the operation phase 902, the I/O controller 805 arbitrate simultaneous disk I/O requests from the manageability platform 510 and the host system in a manner as described earlier.

At 1024, once arbitrated the return disk blocks of data are passed to the manageability OS 811 and then onto the virus scanner application 810.

At 1026, now that the virus scanner application has access to the files, it retrieves its virus signatures from the ROM 514 and the scan is performed on the returned disk blocks. In other words, the storage-centric management application is executed on the returned disk blocks.

At 1028, when viruses are detected, they are fed into the virus recovery system which is responsible for the recovery phase 903 to trigger additional actions by the manageability platform 510 during the application execution, such as removing the detected viruses, based on the administrative/reactive policies as also provided by the policy system 809.

Accordingly, embodiments of a system architecture for delegating manageability applications, particularly storage-centric manageability applications, as described herein provide several benefits.

First, such delegation improves host application performance. Delegating the manageability applications to a separate processing element eliminates resource contention and interference at all higher levels of the system, including at the thread level, at the shared caches' level, and at the memory bus level. Furthermore, having a separate OS stack for such a processing element also eliminates software level contention. This allows for a more powerful policy engine, such as the policy system 809, that enables more intelligent arbitration between the host applications and manageability applications to improve performance.

Second, delegating the manageability applications away from the host system improves host power efficiency in certain cases. For example, compared to the host processor, the separate delegated computing element may be smaller, and consequently, the system architecture embodiments as described herein are likely to be more power efficient compared to traditional approaches. Isolating the two applications also provide greater opportunity for dynamic power control techniques like voltage and frequency scaling.

Third, delegating the manageability applications away from the host system enable separation of the manageability and host application domains for control and security. As discussed earlier, administrators often prefer additional control on manageability applications to have stricter controls on disabling or changing parameters. (For example, disabling virus scanning by a system user to improve performance might be disastrous.) From a fault-tolerance perspective, again, having separate hardware fault domains for the manageability and host processing provides valuable benefits, such as isolating failures due to software errors, hardware errors, security attacks so that these failure do not spread from one domain to another.

Fourth, delegating the manageability applications away from the host system enables use of an out-of-band power domain for manageability in certain cases. For example, in the system architecture 500 illustrated in FIG. 5, having the manageability platform 510, with the MP 512 therein, in a separate power domain has additional value. For example, disk indexing or virus scanning can potentially be executed even when the host system is not running.

Fifth, delegating the manageability applications away from the host system enables portability of the manageability functionality. For example, it is desirable to have a common manageability solution across different kinds of systems. Thus, adding the manageability platform 510 with its MP 512 at the southbridge or I/O controller bus enables portability of the architecture across multiple vendors.

Sixth, from the perspective of a manageability application, delegating the manageability applications away from the host system also provide several benefits. For example, given its own local processing, many manageability tasks may be run 24×7 in the background all the time without having to deal with issues around resource contention. For applications like security or data integrity, this can be an important issue. Also, the proximity of the delegated computing element to the storage subsystem may potentially reduce the I/O latency, further improving the manageability performance.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system architecture for delegating a storage-centric manageability (SCM) task, the system architecture comprises:

a host system that includes a host computing element and a data storage area, wherein the host computing element operates to execute a host system task to access the data storage area via a first data path, and wherein the host system operates to delegate the SCM task from execution by the host computing element;

a delegated computing element that operates to execute the storage-centric manageability task delegated away from the host system; and a second data path provided for the delegated computing element to access the data storage area for executing the delegated SCM task, wherein the second data path is different from the first data path to minimize interference between the first and second data path, wherein the SCM task includes routinely accessing the data storage area during an operation lifecycle phase of an information technology system to perform at least one of virus scanning, data storage backup, memory integrity checking, and system fault diagnosis.

2. The system architecture of claim 1, wherein the host system includes a host operating system (OS) for executing the host system task therein, and the delegated computing element executes the delegated SCM task in an embedded OS that is different from the host OS.

3. The system architecture of claim 1, wherein:

the delegated computing element is a general-purpose computer processor that is dedicated to executing one or more manageability tasks in the host system that is delegated by the host system.

4. The system architecture of claim 3, wherein:

the first data path provides the host computing element with access to the data storage area via a system bus of the system architecture; and the second data path provides the delegated computing element with access to the data storage area via an input/output (I/O) bus of the system architecture.

5. The system architecture of claim 1, wherein:

the host computing element operates to perform a host system task while delegating a manageability task in the host system to the delegated computing element;

the delegated computing element is dedicated to executing a manageability task in the host system; and the host computing element and the delegated computing element are processor cores in a same multi-core processor.

6. The system architecture of claim 1, wherein:

the host computing element operates to perform a host system task while reserving a manageability task in the host system to the delegated computing element; and the delegated computing element operates to execute both a manageability task in the host system that is delegated by the host computing element and a host system task; and the host computing element and the delegated computing element are separate general-purpose computer processors.

7. The system architecture of claim 1, wherein:

the host computing element includes a computer processor that operates to perform a host system task while delegating a manageability task in the host system to the delegated computing element;

the delegated computing element is a device controller for the data storage area that is dedicated to executing a manageability task in the host system that is delegated by the host computing element.

8. The system architecture of claim 1, wherein:

the data storage area includes a device controller that supports one of hardware arbitration and virtualized disk abstraction to provide arbitration between accesses to the data storage area from the first and second data paths.

9. A method for delegating a storage-centric manageability (SCM) task from a host system, wherein the host system includes a host computing element and a data storage area, the method comprises:

setting up a first communication path from the host computing element to the data storage area;

setting up a second communication path from the delegated computing element to the data storage area, the second communication path is different from the first communication path;

implementing the host computing element;

executing the host system task with the host computing element;

implementing a delegated computing element that is different from the host computing element;

delegating at least a storage-centric manageability (SCM) task in the host system to the delegated computing element; and executing the storage-centric manageability task with the delegated computing element, wherein the SCM task includes routinely accessing the data storage area during an operation lifecycle phase of an information technology system to perform at least one of virus scanning, data storage backup, memory integrity checking, and system fault diagnosis.

10. The method of claim 9, further comprising:

implementing a host operating system (OS) in the host system for executing the host system task therein; and implementing a delegated OS for executing the SCM task, wherein the delegated OS is different from the host OS.

11. The method of claim 9, wherein:

delegating at least a storage-centric manageability task to the delegated computing element comprises delegating one or more manageability tasks in the host system, including the SCM task, to the delegated computing element; and implementing the delegated computing element comprises implementing the delegated computing element dedicated to executing one or more delegated manageability tasks, including the SCM task.

12. The method of claim 9, wherein:

implementing the host computing element comprises implementing the host computing element as a first core in a multi-core computer processor of the host system; and implementing the delegated computing element comprises implementing the delegated computing element as a second core in the multi-core computer processor of the host system.

13. The method of claim 9, wherein:

implementing the host computing element comprises implementing the host computing element as a first general-purpose computer processor that operates to execute the host system task; and implementing the delegated computing element comprises implementing the delegated computing element as a second general-purpose computer processor that operates to execute one or more other host system tasks and the delegated SCM task.

14. The method of claim 9, wherein:
- implementing the host computing element comprises implementing the host computing element as a general-purpose computer processor that operates to execute the host system task; and
- implementing the delegated computing element comprises implementing the delegated computing element as a disk controller for a disk memory drive in the data storage area.

15. A method for delegating a storage-centric manageability (SCM) task from a host computer processor to a delegated computing element separate from the host computer processor in a host system, the method comprises:
- setting up a first input/output (I/O) controller path from the host computing element to the data storage area;
- setting up a second communication path from the delegated computing element to the data storage area, the second communication path is different from the first communication path;
- accessing a file system of a data storage area of the host system using a host operating system (OS) implemented on the host computer processor;
- accessing the file system of the data storage area of the host system using delegated OS implemented on the delegated computing element;
- implementing the host computer processor to execute a host system task in the host system; and
- implementing the delegated computing element to execute manageability tasks, including the SCM task, in the host system,
- wherein the SCM task includes routinely accessing the data storage area during an operation lifecycle phase of an information technology system to perform at least one of virus scanning, data storage backup, memory integrity checking, and system fault diagnosis.

16. The method of claim 15, further comprising:
- loading a policy engine for the delegated computing element;
- triggering an execution of the SCM task based on at least one predefined policy in the policy engine.

17. The method of claim 16, further comprising:
- transmitting a first input/output (I/O) request associated with the host system task from the host computer processor to the data storage area via the first communication path;
- transmitting a second I/O request associated with the SCM task from the host computing element to the data storage area via the second communication path, wherein the second I/O request is transmitted substantially simultaneous with the first I/O request;
- arbitrating the substantially simultaneous transmitted first and second I/O requests;
- retrieving data from the data storage area based on the arbitrating; and
- the delegated computing element executing the SCM task on the retrieved data.

18. The method of claim 17, further comprising:
- triggering execution of at least one additional action for executing the SCM task based on another predefined policy in the policy engine.

19. The method of claim 9, wherein the delegated computing element is a general-purpose computer processor that is dedicated to executing one or more manageability tasks in the host system.

* * * * *